United States Patent
Hinz

(10) Patent No.: US 7,434,821 B2
(45) Date of Patent: Oct. 14, 2008

(54) VEHICLE SUSPENSION WITH LIFT AXLE AND PIVOTAL LIFT SPRING

(75) Inventor: John A. Hinz, Monticello, IN (US)

(73) Assignee: Tuthill Corporation, Burr Ridge, IL (US)

(*) Notice: Subject to any disclaimer, the term of this patent is extended or adjusted under 35 U.S.C. 154(b) by 303 days.

(21) Appl. No.: 11/123,323

(22) Filed: May 6, 2005

(65) Prior Publication Data
US 2006/0249922 A1 Nov. 9, 2006

(51) Int. Cl.
*B62D 61/12* (2006.01)
*B60G 11/27* (2006.01)

(52) U.S. Cl. .................. 280/86.5; 280/43; 280/124.116
(58) Field of Classification Search ................ 280/86.5, 280/43, 124.116; 180/209
See application file for complete search history.

(56) References Cited

U.S. PATENT DOCUMENTS

| | | | | |
|---|---|---|---|---|
| 4,653,773 | A * | 3/1987 | Graft | 280/93.5 |
| 4,773,670 | A | 9/1988 | Raidel, II | |
| 4,792,148 | A | 12/1988 | Hintz | |
| 4,881,747 | A | 11/1989 | Raidel | |
| 5,015,004 | A | 5/1991 | Mitchell | |
| 5,018,756 | A | 5/1991 | Mitchell | |
| 5,230,528 | A | 7/1993 | Van Raden et al. | |
| 5,403,031 | A | 4/1995 | Gottschalk et al. | |
| 5,505,481 | A | 4/1996 | VanDenberg et al. | |
| 5,649,719 | A | 7/1997 | Wallace et al. | |
| 6,003,890 | A * | 12/1999 | Inouye | 280/270 |
| 6,062,578 | A | 5/2000 | Richardson | |
| 6,073,946 | A | 6/2000 | Richardson | |
| 6,158,750 | A | 12/2000 | Gideon et al. | |
| 6,182,984 | B1 * | 2/2001 | Chalin | 280/86.751 |
| 6,398,236 | B1 | 6/2002 | Richardson | |
| 6,669,303 | B2 * | 12/2003 | Dodd | 298/17 B |
| 6,880,839 | B2 * | 4/2005 | Keeler et al. | 280/86.5 |
| 7,392,996 | B2 * | 7/2008 | Mattocks | 280/86.751 |
| 2003/0107198 | A1 | 6/2003 | VanDenberg | |
| 2004/0056441 | A1 * | 3/2004 | Chalin | 280/86.5 |
| 2004/0178594 | A1 * | 9/2004 | Keeler et al. | 280/86.5 |
| 2007/0170685 | A1 * | 7/2007 | Chalin et al. | 280/124.157 |

OTHER PUBLICATIONS

Photographs dated Feb. 18, 2005 of prior suspension by Silent Drive, Inc., with lift axle spring mounted to cross member located between the two support hangers (five photographs).

* cited by examiner

*Primary Examiner*—Christopher Ellis
*Assistant Examiner*—Joseph Rocca
(74) *Attorney, Agent, or Firm*—George Pappas

(57) ABSTRACT

A lift axle suspension system for use on a vehicle having a chassis. The lift axle suspension system includes an axle assembly that is operably coupled to the vehicle chassis with a support arm assembly. A support biasing member is located between the axle assembly and the vehicle chassis for transferring loads between the axle assembly and the vehicle chassis. A lift spring member is also provided. The lift spring member is an air spring member and has one end that is pivotally mounted. Extension of the lift spring member lifts the axle assembly from a use position where the wheels attached to the axle assembly are engageable with a road surface to a storage position where the wheels attached to the axle assembly are not engaged with the road surface.

20 Claims, 7 Drawing Sheets

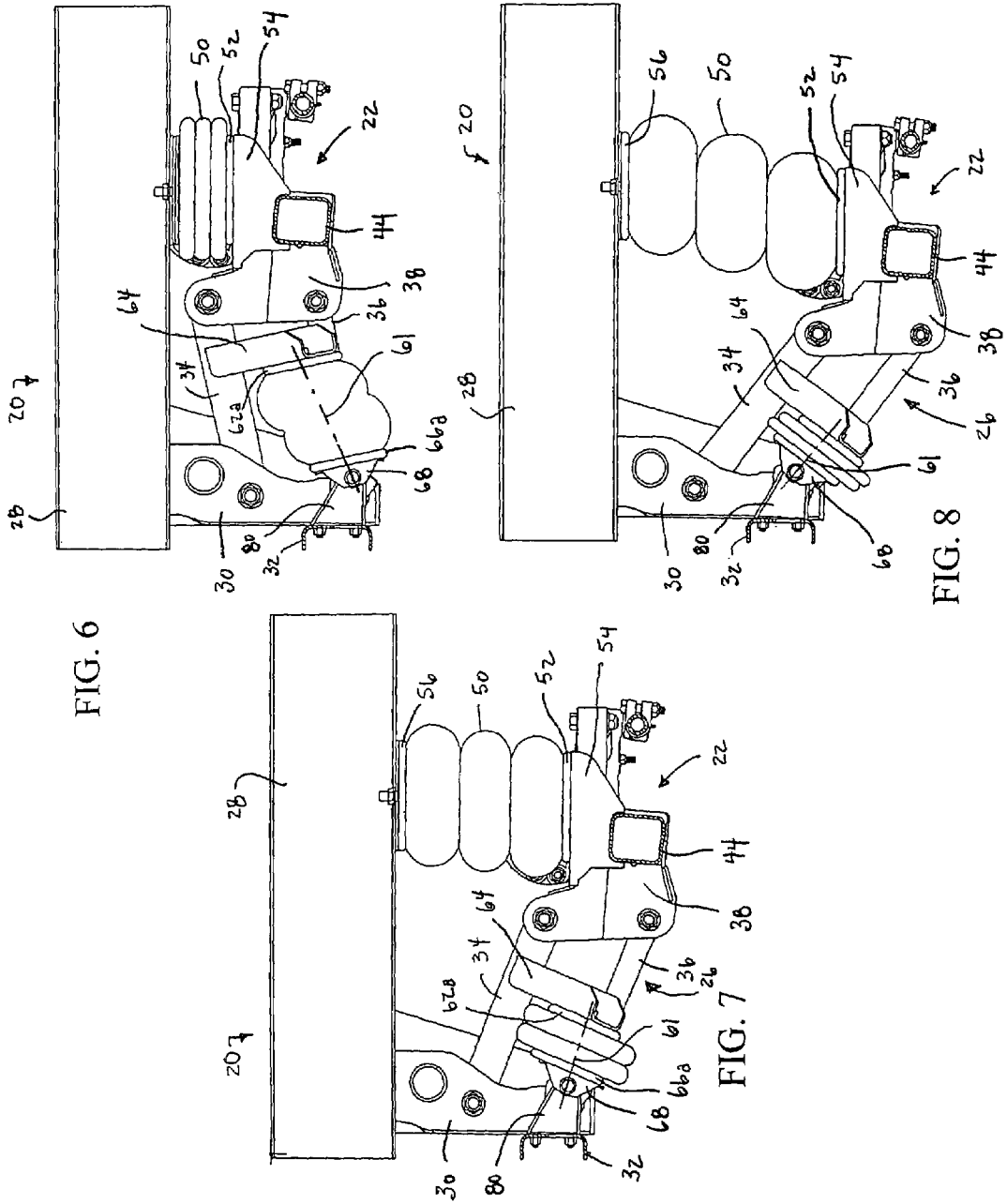

VEHICLE SUSPENSION WITH LIFT AXLE AND PIVOTAL LIFT SPRING

BACKGROUND OF THE INVENTION

1. Field of the Invention

The present invention relates to lift axle suspension systems and, more particularly, to a lift axle suspension system having an air spring lift member.

2. Description of the Related Art

A variety of lift axle suspension systems are known in the art. Many heavy-duty trucks and similar vehicles utilize one or more liftable auxiliary axles also referred to as lift axles. When the truck is carrying a heavy load, the lift axle will be lowered so that the wheels mounted on the lift axle can engage the road surface and the lift axle can bear a portion of the vehicle load. The axle is lifted out of service, with its wheels disengaged from the road surface, when the truck is empty or carrying only a light load and the additional load carrying capacity provided by the lift axle assembly is not required.

Such lift axles often employ two identical parallelogram linkages located on opposite sides of the vehicle. Each of the parallelogram linkages includes an upper support arm and a lower support arm. Typically, the upper and lower support arms are pivotally mounted on a support hanger that extends downwardly from a longitudinal rail member of the truck chassis on one end and pivotally connected to the lift axle on their opposite ends. A support spring, typically an air spring, is provided between the axle assembly and the chassis to transfer loads between the truck chassis and the axle assembly when the axle is lowered and the attached wheels engage the road surface. A second air spring is conventionally used to provide a lift spring for the axle assembly. Such lift axles may also be steerable axles and include steering mechanisms.

When it is desired to lower the lift axle, the support air spring positioned between the axle assembly and chassis is energized or inflated to extend the support spring and the lift air spring is simultaneously de-energized or deflated to retract the lift spring. To raise the lift axle, the support air spring is de-energized or deflated to retract the support spring and the lift air spring member is energized or inflated to extend the lift spring. Known lift axle suspensions have employed lift spring members in a number of different positions for lifting the axle assembly. While such known assemblies are effective, an improved lift axle suspension system that is rugged, reliable and that can be cost effectively manufactured is desirable.

SUMMARY OF THE INVENTION

The present invention provides a lift axle suspension system having a lift spring that is pivotally mounted at one end and which can be pivotally mounted to a cross member extending between hangers on the vehicle chassis.

The invention comprises, in one form thereof, a suspension system that includes a vehicle chassis, an axle assembly and a support arm assembly operably coupling the axle assembly to the vehicle chassis wherein the axle assembly is vertically moveable relative to the vehicle chassis. A support biasing member, such as an air spring, is disposed between the axle assembly and the vehicle chassis. A lift spring member is also provided. The lift spring member is an air spring with opposing first and second ends and defines a central axis. Each of the first and second lift spring ends are operably coupled to the suspension system wherein extension of the lift spring vertically displaces the axle assembly relative to the vehicle chassis. The first lift spring end is pivotally mounted about a pivot axis wherein the central axis of the lift spring intersects the pivot axis.

The invention comprises, in another form thereof, a lift axle suspension assembly for a vehicle having a chassis. The lift axle suspension assembly includes an axle assembly and a pair of support arms operably coupling the axle assembly to the vehicle chassis wherein the axle assembly is moveable relative to the vehicle chassis between a storage position and a use position. A support biasing member is operably disposed between the axle assembly and the vehicle chassis. A lift spring member is also provided. The lift spring member is an air spring that defines a central axis and has opposing first and second ends. The lift spring member is operably disposed between the axle assembly and the vehicle chassis wherein extension of the lift spring member moves the axle assembly from the use position to the storage position. The first lift spring end is pivotal about a pivot axis and the central axis of the lift spring member intersects the pivot axis.

The invention comprises, in yet another form thereof, a suspension system that includes a vehicle chassis and an axle assembly. The vehicle chassis has first and second longitudinal members with first and second hangers respectively extending downwardly from the first and second longitudinal members. A cross member extends between the two hangers. A support arm assembly operably couples the axle assembly to the vehicle chassis wherein the axle assembly is vertically moveable relative to the vehicle chassis. A support biasing member, such as an air spring, is disposed between the axle assembly and the vehicle chassis. At least one lift spring member is also provided. The lift spring member is an air spring with opposing first and second lift spring ends. The first lift spring end is pivotally mounted to the cross member and the second lift spring end is coupled to the support arm assembly wherein extension of the lift spring member vertically displaces the axle assembly.

The invention comprises, in still another form thereof, a lift axle suspension assembly for a vehicle having a chassis. The lift axle suspension assembly includes an axle assembly and a support arm assembly operably coupling the axle assembly to the vehicle chassis wherein the axle assembly is vertically moveable relative to the vehicle chassis between an uppermost position and a lowermost position. A support biasing member is operably disposed between the axle assembly and the vehicle chassis. A lift spring member is also provided. The lift spring member is an air spring and has opposing first and second ends and defines a central axis. The first end of the lift spring member is pivotally mounted about a pivot axis. The lift spring member is operably disposed between the vehicle chassis and the axle assembly wherein extension of the lift spring member vertically displaces the axle assembly. The central axis has a first angular position relative to the pivot axis when said axle assembly is in the lowermost position and a second angular position relative to the pivot axis when the axle assembly is in the uppermost position. The first and second angular positions of the lift spring member define a first predefined angular range therebetween. First and second pivot stops are disposed proximate the first end of the lift spring member wherein the first pivot stop limits rotation of the lift spring member in a first rotational direction about the pivot axis and the second pivot stop limits rotation of the lift spring member in a second opposite rotational direction about the pivot axis whereby rotation of the lift spring member about the pivot axis is limited to a second predefined angular range. The second predefined angular range being larger than the first predefined angular range.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 6 is a side view of the lift axle suspension system in an uppermost storage position.

FIG. 7 is a side view of the lift axle suspension system in a use position.

FIG. 8 is a side view of the lift axle suspension system in a lowermost position.

Figure 1:
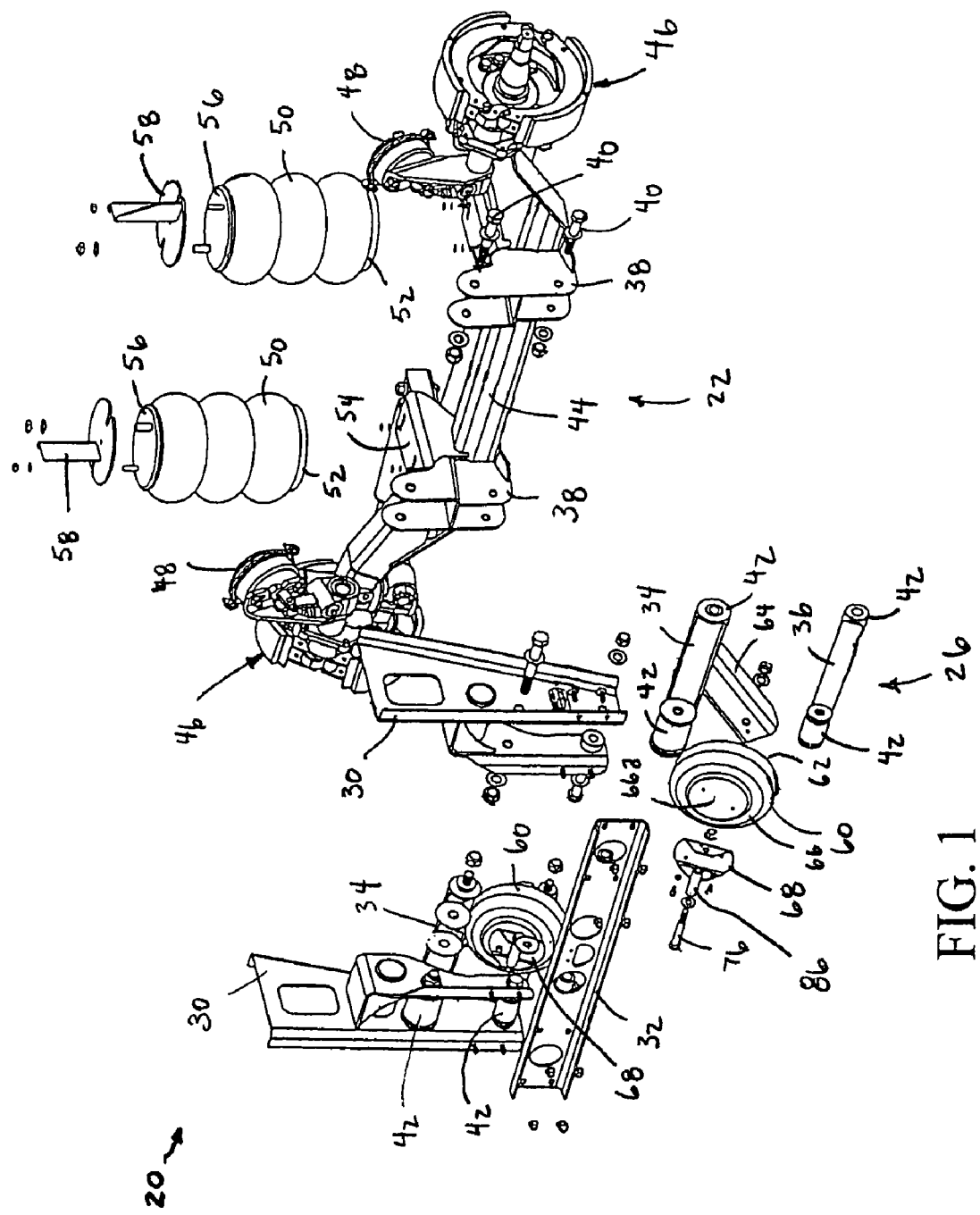
FIG. 1 is an exploded perspective view of a lift axle suspension system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 2:
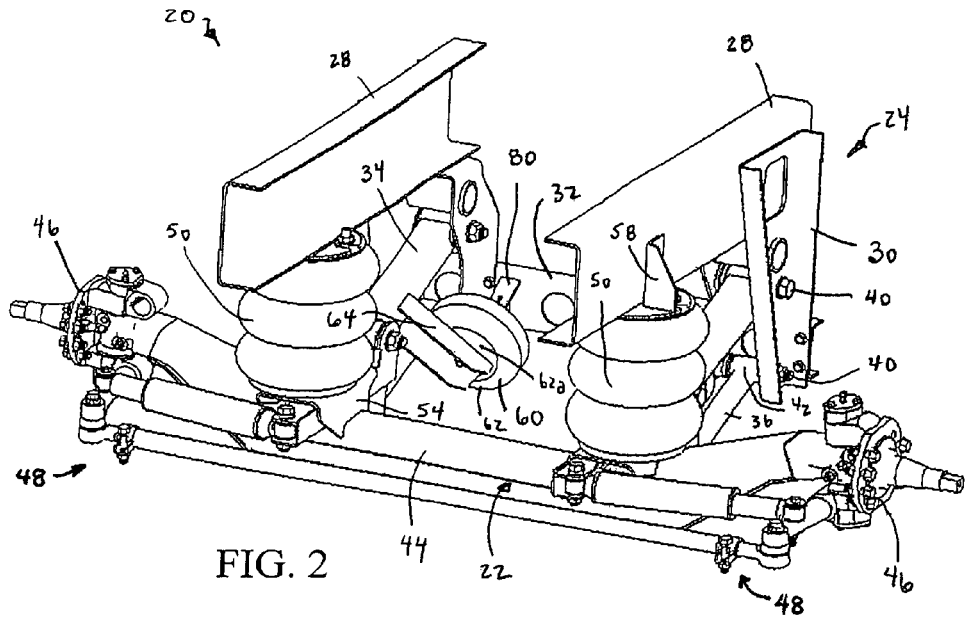
FIG. 2 is a perspective view of the lift axle suspension system.
Figure 3:
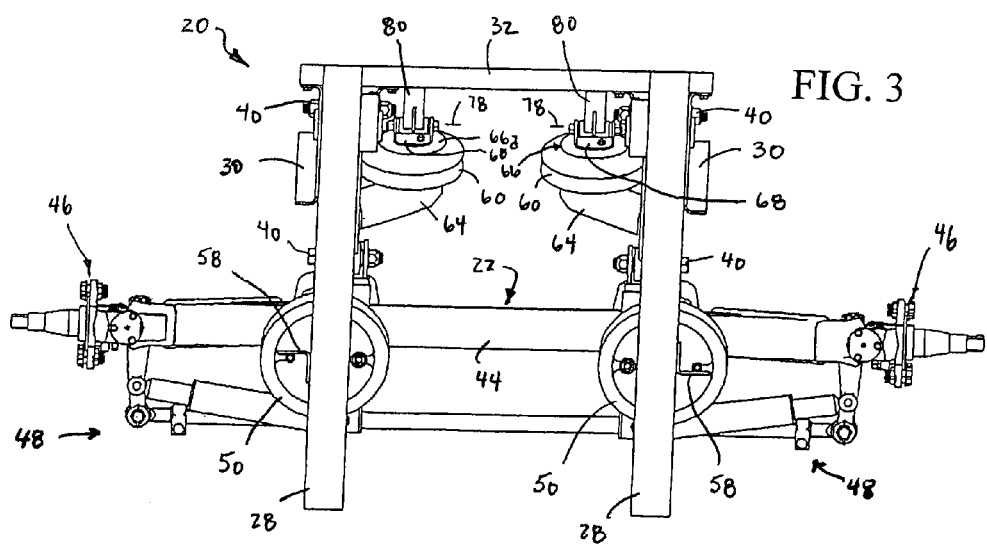
FIG. 3 is a top view of the lift axle suspension system.
Figure 4:
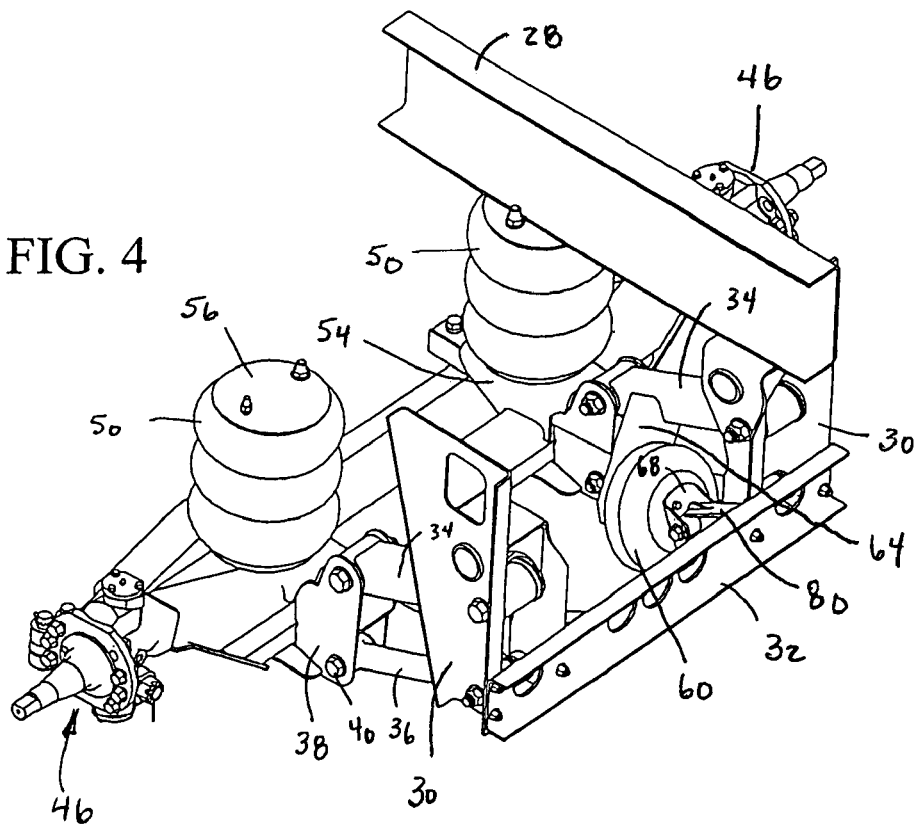
FIG. 4 is another perspective view of the lift axle suspension system.
Figure 9:
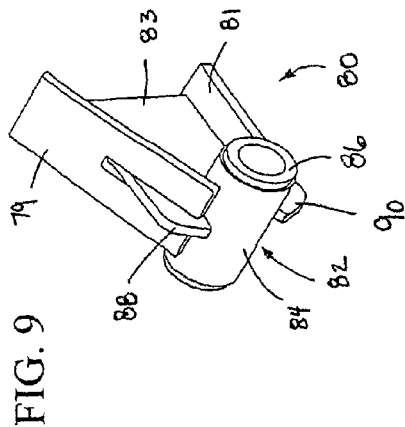
FIG. 9 is a perspective view of a structural member having a sleeve and pivot bushing.
Figure 10:
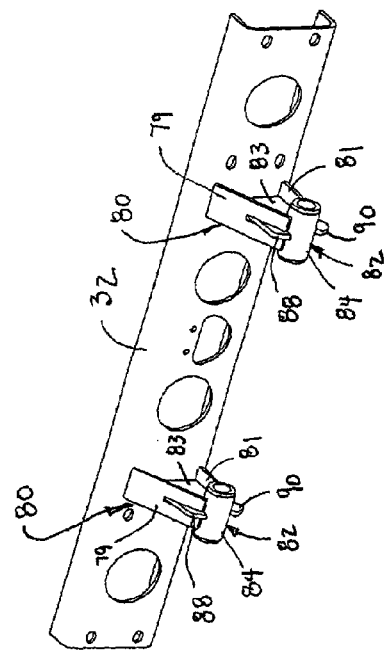
FIG. 10 is a perspective view of cross member with structural members for pivotally supporting two lift spring members.
Figure 11:
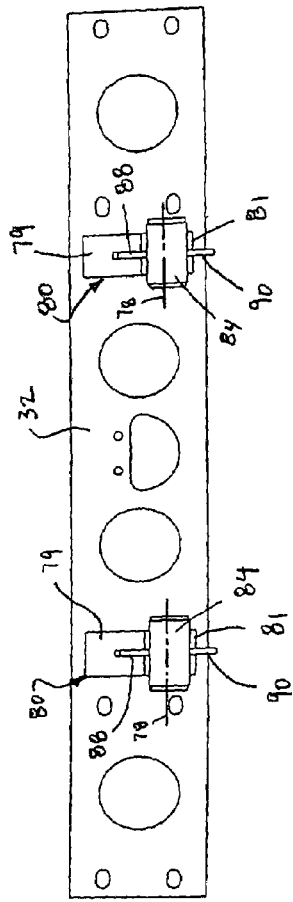
FIG. 11 is a front view of the cross member and structural members of FIG. 10.
Figure 12:
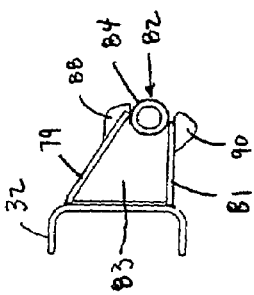
FIG. 12 is a side view of the cross member and structural members of FIG. 10.

A lift axle suspension system 20 in accordance with the present invention is shown in an exploded view in FIG. 1. Suspension system 20 is shown in a deployed or in use position in FIGS. 2-4 and includes an axle assembly 22 that is attached to vehicle chassis 24 with support arm assemblies 26.

Vehicle chassis 24 includes two structural rails 28 that extend longitudinally along the vehicle and form a portion of the vehicle frame. The frames of heavy duty vehicles typically include two structural rails that are located on opposite sides of the vehicle and that extend for the longitudinal length of the truck bed or payload area of the vehicle. One or both of the longitudinal members or rails 28 are omitted from many of the Figures for purposes of graphical clarity. Vehicle chassis 24 also includes two support hangers 30 which extend downwardly from the two longitudinal rails 28. A cross member 32 extends laterally between the two support hangers 30 and also forms a portion of chassis 24.

Two support arm assemblies 26 are used to mount axle assembly 22 to the vehicle chassis 24 with each of the support arm 22 assemblies 26 being secured to a respective one of the support hangers 30. Each of the support arm assemblies 26 includes an upper support arm 34 and a lower support arm 36. At one end, the upper and lower support arm 34, 36 of each assembly 26 is pivotally attached to a support hanger 30. The opposite ends of the upper and lower support arms 34, 36 are pivotally attached to the axle assembly 22 through a saddle member 38. Nut and bolt assemblies 40 are used to pivotally secure the upper and lower support arms 34, 36 which include a pivot sleeve 42 having a pivot bushing located therein at each of their ends for receiving bolt assemblies 40.

The upper and lower support arms 34, 36 are mounted to define a parallelogram linkage so that the caster angle of axle assembly 22 remains substantially constant as the axle assembly is raised and lowered with respect longitudinal rails 28. The use of upper and lower support arms in a parallelogram linkage assembly to attach an axle assembly to a vehicle chassis is well known to those having ordinary skill in the art. Gideon et al. in U.S. Pat. No. 6,158,750 disclose one example of a lift axle suspension having upper and lower support arms and pivot bearings at the ends of such support arms that can be adapted for use with the present invention, the disclosure of which is hereby incorporated herein by reference.

Axle assembly 22 includes an axle 44 attached to saddle members 38. Wheel hubs 46 are attached at the opposite ends of axle 44 for attaching wheels (not shown). Axle assembly 22 also includes a steering mechanism 48 proximate each wheel hub 46 for controlling the steering angle of the wheel hubs 46 and attached wheels in a manner well known to those having ordinary skill in the art. Although axle assembly 22 illustrates one example of an axle assembly that can be used with the present invention, alternative axle assemblies, e.g., an axle assembly without steering mechanisms, can also be employed with the present invention.

Support biasing members 50 are positioned between axle assembly 22 and the vehicle chassis 24 to transfer loads between the chassis 24 and axle assembly 22. Two air spring suspension springs are used to form the support biasing members 50 in the illustrated embodiment. Air springs 50 have a bottom plate 52 secured to horizontal mounting sections 54 of saddle members 38 to thereby couple the air springs 50 with axle 44. Each of the air springs 50 also has an upper plate 56 that is secured to one of the longitudinal rails 28 through mounting member 58. When air springs 50 are inflated and axle 44 is positioned so that wheels attached thereto will engage the road surface, air springs 50 function as suspension springs transferring a portion of the weight of the vehicle to axle assembly 22 where it is subsequently transferred to the road surface by the attached wheels.

A lift spring member 60 is secured between each of the upper support arms 34 and cross member 32 and is used to vertically displace axle assembly 22. More specifically, inflation of lift spring member 60, occurring contemporaneously with the deflation of air springs 50, lifts the wheels attached to axle assembly 22 out of engagement with the road surface when the vehicle does not require the extra load carrying capacity provided by axle assembly 22. Lift spring member 60 is an air spring. Double convoluted and triple convoluted air springs suitable for air springs 60 and 50 respectively, are commercially available from Firestone Industrial Products Company having a place of business at Carmel, Ind.

Figure 16:
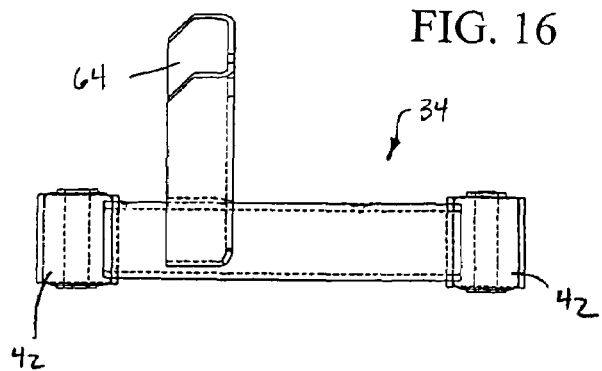
FIG. 16 is a top view of an upper support arm of the suspension system of FIG. 1.
Figure 17:
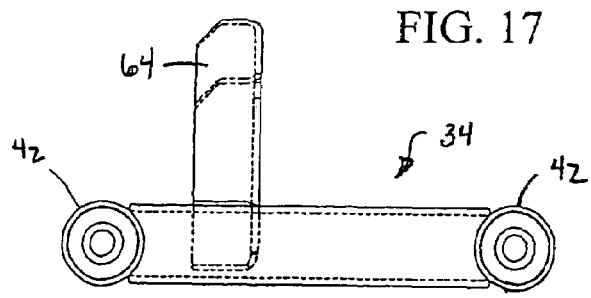
FIG. 17 is a side view of the upper support arm of FIG. 16.
Figure 18:
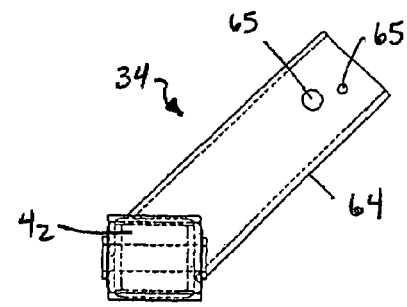
FIG. 18 is an end view of the upper support arm of FIG. 16.

For each of the support arm assemblies 26, lift spring 60 has a fixed end 62 that is non-pivotally secured to a rigid member 64 that extends from upper support arm 34 laterally inwardly toward the longitudinal center line of the vehicle located midway between rails 28 and downwardly. The configuration of upper support arms 34 is best seen in FIGS. 16-18. Rigid member 64 includes openings 65 for receiving bolt shafts (not shown) extending from spring end 62 to rigidly fix spring end 62 to upper support arm 34. The opposite end 66 of lift spring 60 is pivotally mounted.

Figure 5:
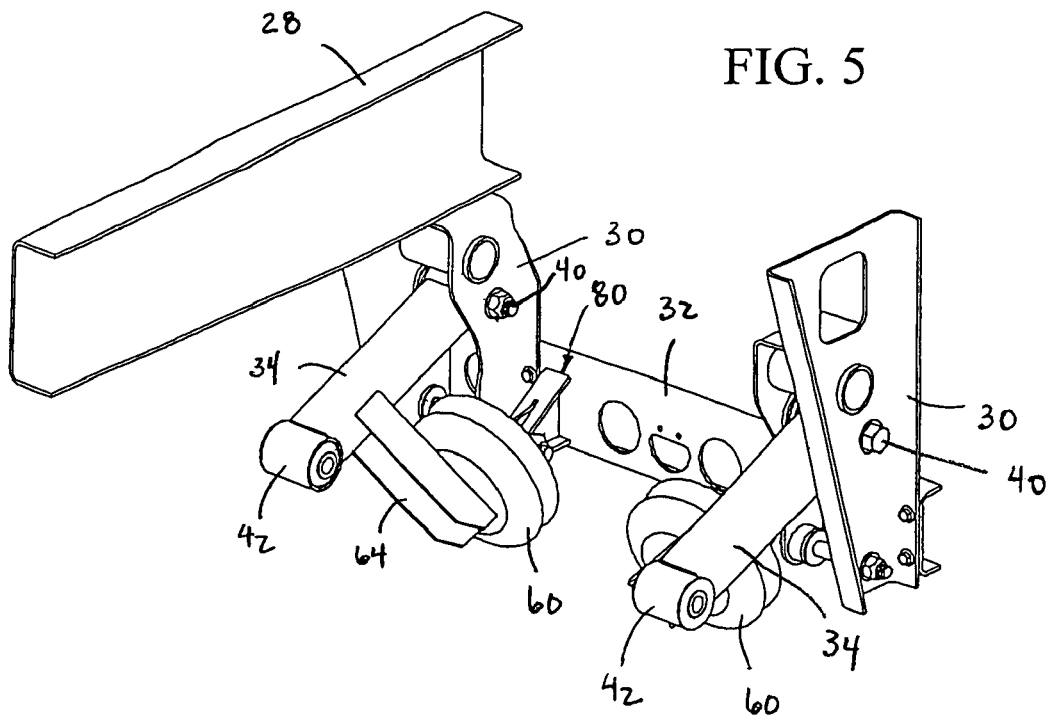
FIG. 5 is a partial perspective view of the lift axle suspension system.
Figure 13:
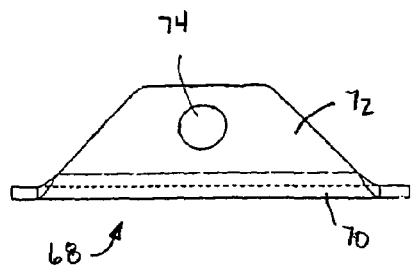
FIG. 13 is a side view of a pivot mount that is secured to the lift spring member.
Figure 14:
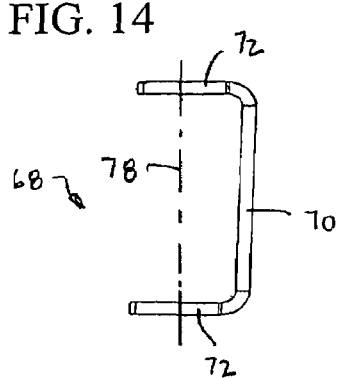
FIG. 14 is an end view of the pivot mount of FIG. 13.
Figure 15:
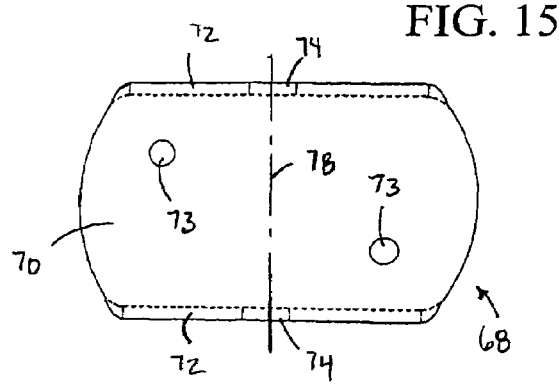
FIG. 15 is a plan view of the pivot mount of FIG. 13.

Attached to end 66 of each of lift springs 60 is a pivot mount 68 which is separately illustrated in FIGS. 13-15. As best seen in FIG. 14, pivot mount 68 has a generally U-shaped configuration with a central web 70 and two sidewalls 72. Aligned openings 74 are provided in sidewalls 72 for receiving a bolt which acts as pivot pin 76 and defines a pivot axis 78 about which lift spring 60 is pivotal. Openings 73 in central web 70 receive bolt shafts for securing pivot mount 68 to an end 66 of a lift spring 60. A structural member 80 is secured to cross member 32 and has a generally I-shaped cross section with upper and lower horizontal flanges 79, 81, and a vertical web 83. A metal sleeve 84 extends transversely to structural member 80 and is secured at the distal end 82 of member 80. A bushing 86 is located in sleeve 84 for rotational engagement with pivot pin 76. Structural members 80 can be welded to cross member 32 or have mounting flanges which allow members 80 to be bolted to cross member 32. FIG. 5 provides a partial perspective view of lift axle suspension system 20 that illustrates one of longitudinal rails 28, hangers 30, cross member 32, structural members 80 (only one is visible in FIG. 5), lift springs 60 and upper support arms 34.

Two pivot stops 88, 90 are also mounted on structural member 80. The upper pivot stop 88 is located vertically above pivot axis 78 and the lower pivot stop 90 is located below pivot axis 78. Pivot stops 88, 90 are steel plate and lie in a plane oriented perpendicular to pivot axis 78 and are positioned parallel and midway between sidewalls 72 whereby pivot stops 88, 90 are engageable with central web 70 to limit the rotation of lift spring 60. More specifically, when lift spring 60 is rotated upwardly about pivot axis 78, upper pivot stop 88 defines a limit to the angular range within which lift spring 60 can be rotated and, when lift spring 60 is rotated downardly about pivot axis 78, lower pivot stop 90 defines a limit to the angular range within which lift spring 60 can be rotated.

The operation of lift axle suspension system 20 is best understood with reference to the side views of system 20 presented in FIGS. 6-8 which illustrate the vertical movement of axle assembly 22 relative to vehicle chassis 24. FIG. 6 illustrates system 20 wherein support spring 50 is deflated and compressed and lift spring 60 has been inflated and extended to thereby place axle assembly 22 in its uppermost position relative to vehicle chassis 24. This uppermost position of axle assembly 22 shown in FIG. 6 defines a storage position for axle assembly 22. When axle assembly 22 is placed in the storage position of FIG. 6, the wheels attached to axle assembly 22 will be lifted off the road surface and axle assembly 22 will not bear any of the weight of the vehicle.

FIG. 7 illustrates system 20 wherein support spring 50 has been inflated and extended and lift spring 60 has been deflated and compressed to thereby lower axle assembly 22 into a use position. In this use position of FIG. 7, the wheels attached to axle assembly 22 will be engaged with the road surface and loads will be transferred to the road surface from rails 28 through support springs 50 and axle assembly 22. As will be appreciated by those having ordinary skill in the art, suspension system 20 is designed to allow for a range of vertical movement of each of the two opposite ends of axle assembly 22 and the wheels attached thereto while still transferring loads to axle assembly 22 through support springs 50 to facilitate travel over uneven road surfaces. Thus, during normal use, axle assembly 22 may move slightly upwardly and downwardly from the use position shown in FIG. 7 with support springs 50 transferring loads between axle assembly 22 and longitudinal rails 28. FIG. 8 illustrates support spring 50 in its fully extended position and the lower limit or lowermost position of axle assembly 22 when the axle assembly 22 has been lowered to bear a portion of the vehicle load.

When it is desired to once again raise axle assembly 22 to its storage position, the support springs 50 are deflated and lift springs 60 are inflated to thereby extend springs 60 and raise axle assembly 22 to the position shown in FIG. 6. As lift springs 60 are inflated and extended, pivotal ends 66 of lift springs 60 pivot about pivot axes 78 while the opposite ends 62 of lift springs 60 which are fixed relative to upper support arms 34 bias support arm assemblies 26 and attached axle assembly 22 upwardly to their storage positions. Although a particular location for lift spring members 60 is illustrated in the attached drawings, alternative attachment locations are also possible for lift spring members 60. For example, instead of fixing lift spring ends 62 relative to upper support arms 34, lift spring ends 62 could be attached to axle assembly 22 through saddle members 38. Those having ordinary skill in the art will recognize that other modifications are also possible within the scope of the present invention.

Lift springs 60 have rigid plates 62a, 66a located respectively at opposite ends 62, 66. Lift springs 60 also define a central axis 61. Central axis 61 intersects the pivot axis 78. When the plates 62a, 66a at ends 62, 66 are positioned parallel to each other, the central axis 61 of that spring 60 extends linearly along the centerline of the lift spring 60 and intersects rigid plates 62a, 66a at equal, substantially perpendicular angles. As can be seen in FIGS. 6-8, as axle assembly 22 moves vertically, each lift spring 60 pivots about pivot axis 78 to define different angular positions for the central axis 61 of the lift springs 60.

Figure 19:
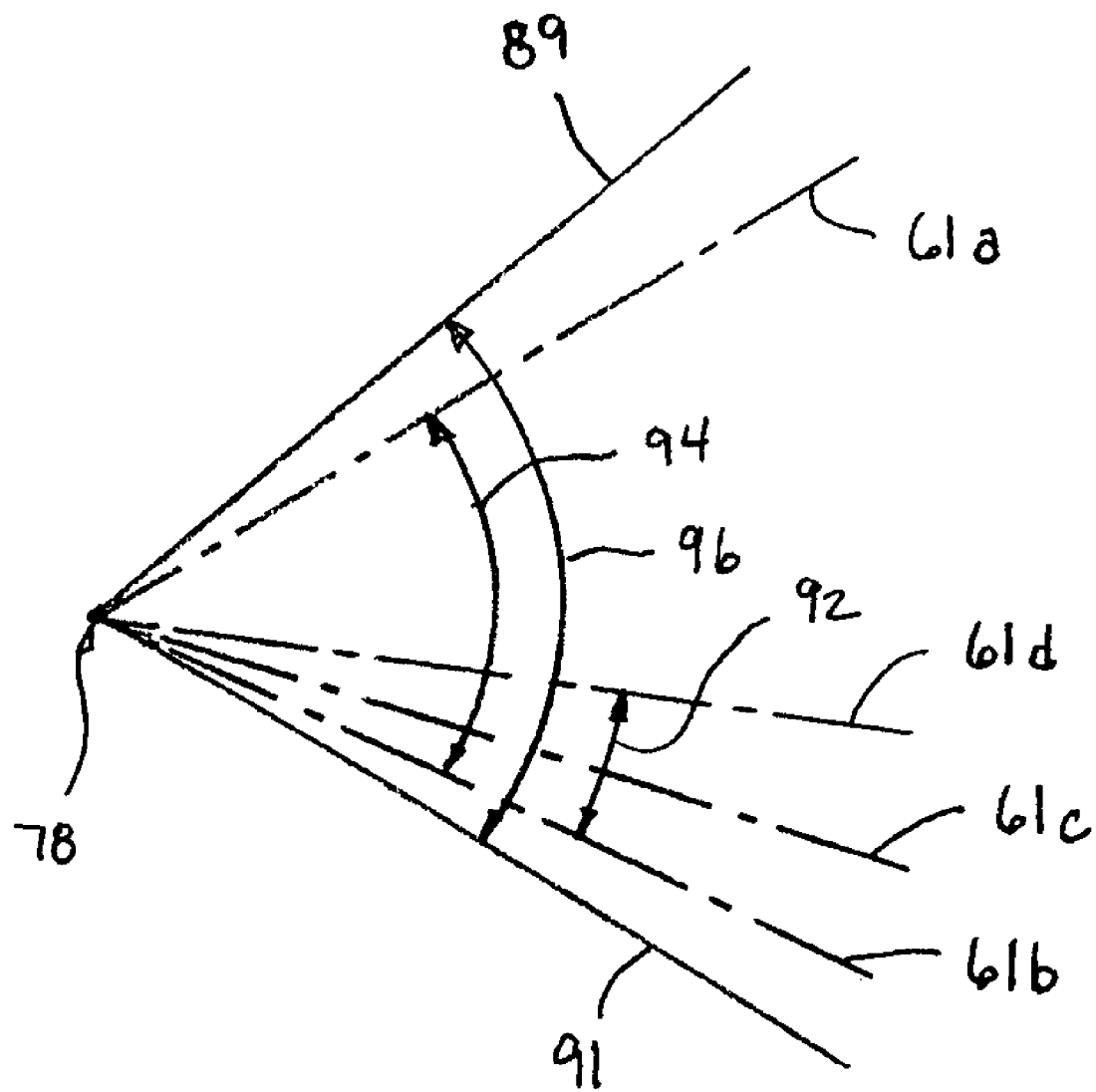
FIG. 19 is a schematic representation of the rotational movement of lift spring member.

When lift springs 60 are first inflated to initiate the upward movement of axle assembly 22 towards its storage position, lift springs 60 are likely to bulge transversely relative to central axis 61 and causing pivotal motion about pivot axis 78. Excessive rotation about pivot axis 78 could damage lift springs 60, however, limited rotation about pivot axis 78 is not necessarily damaging and could even be desirable in limited circumstances to relieve stresses on some of the components of system 20. FIG. 19 provides a schematic representation of the rotational movement of central axis 61 of a lift spring 60. It is noted that the angles presented in this Figure are not necessarily to scale and are presented for purposes of graphical clarity in understanding the operation of system 20.

In FIG. 19, line 61a represents the angular position of central axis 61 when axle assembly 22 is in its uppermost position depicted in FIG. 6, line 61b represents the angular position of central axis 61 when axle assembly 22 is in its lowermost position depicted in FIG. 8 and line 61c represents the angular position of central axis 61 when axle assembly 22 is in the use position depicted in FIG. 7. Line 61d represents the upper boundary of central axis 61 during normal use of axle assembly 22. In other words, when axle assembly 22 is lowered to engage the wheels attached thereto with the road surface, the normal vertical range of motion for axle assembly 22, and concomitant rotation of central axis 61, is represented by angular range 92. Angular range 94 represents the predefined angular range of movement for central axis 61 between the lowermost position of axle assembly 22 depicted in FIG. 8 and the uppermost position of axle assembly 22 depicted in FIG. 6. For each of the lines 61a, 61b, 61c and 61d, the position of these lines assume that lift spring 60 and central axis defined thereby are in a linear configuration with the rigid plates 62a, 66a located on opposite ends 62, 66 of lift spring 60 being position parallel to one another.

Also depicted in FIG. 19 are lines 89 and 91 which are the outer limits of another predefined angular range 96. Line 89 corresponds to the location of central axis 61 if lift spring 60 were to be rotated upwardly until its further rotation was prevented by pivot stop 88. Similarly, line 91 corresponds to the location of central axis 61 if lift spring 60 were to be rotated downwardly until its further rotation was prevented by pivot stop 90. As discussed above, axle assembly 22 does not travel upwardly beyond the point depicted in FIG. 6 or downwardly below the point depicted in FIG. 8, however, the central axis 61 of lift springs 60 are not always linear in shape. More specifically, when axle assembly 22 is in its uppermost position, it is possible for rigid plate 66a and attached pivot mount 68 to rotate further upwardly causing a bend in air spring 60. Pivot stop 88 limits this further upward rotational travel of plate 66a and pivot mount 68 to the angular location depicted by line 89. With regard to this line 89, it is noted that at pivotal end 66, central axis 61 is considered to intersect rigid plate 66a at a perpendicular angle and it is this central axis that cannot rotate beyond line 89. Similarly, when axle assembly 22 is in its lowermost position, pivot stop 90 limits the rotation of pivot mount 68 and attached rigid plate 66a, and central axis 61 defined thereby, to the position indicated by line 91.

When lift spring 60 is in its fully inflated condition, as in FIG. 6, lift spring 60 will naturally seek to be in a linear configuration with end plates 62a and 66a being positioned parallel with each other and central axis in the position depicted by line 61a. It is possible for stop 88 to be located to prevent any further upward rotation of pivotal end 66 of lift spring 60 at this location. In other words, it is possible to configure pivot stop 88 so that line 89 is collinear with line 61a, however, if pivot stop 88 is misaligned it could prevent lift spring 60 from rotating completely upwards to the angular position indicated by line 61a. By positioning pivot stop 88 to permit the slight overration of pivotal end 66, the manufacture and assembly of system 20 and the locating of pivot stop 88 is facilitated. Similarly, pivot stop 90 is positioned to allow a slight overrotation of pivotal end 66. The magnitude of this overrotation, e.g., the angular distance between lines 89 and 61a and between lines 61b and 91 is limited to prevent damage to lift spring 60. Generally, air spring manufacturers establish limits on such angular deviation and allowing an angular deviation greater than the manufacturer's limit will void the warranty provided with the air spring. The angular distance between lines 89 and 61a and between lines 61b and 91 is preferably selected to remain within the air spring manufacturer's guidelines.

It is noted that in the illustrated embodiment both lines 89 and 91 lie outside the angular range 94 defined by lines 61a and 61b to define a larger angular range 96. Stops 88, 90 can, however, also be positioned to define an angular range 96 that is larger than angular range 94 by positioning the stops 88, 90 such that line 89 and line 61a are collinear and only line 91 lies outside angular range 94, or, by positioning stops 88, 90 such that line 91 and line 61b are collinear and only line 89 lies outside angular range 94. In still other embodiments, pivotal stops 88, 90 could be positioned such that lines 89 and 91 are collinear with lines 61a and 61b respectively and angular ranges 94 and 96 are substantially equal.

While this invention has been described as having an exemplary design, the present invention may be further modified within the spirit and scope of this disclosure. This application is therefore intended to cover any variations, uses, or adaptations of the invention using its general principles.

What is claimed is:

1. A suspension system comprising:
   a vehicle chassis;
   an axle assembly;
   a support arm assembly operably coupling said axle assembly to said vehicle chassis wherein said axle assembly is vertically moveable relative to said vehicle chassis;
   a support biasing member operably disposed between said axle assembly and said vehicle chassis;
   a lift spring member wherein:
      (a) said lift spring member is an air spring that defines a central axis and has opposing first and second ends;
      (b) each of said first and second lift spring ends are operably coupled to said suspension system wherein extension of said lift spring member vertically displaces said axle assembly relative to said vehicle chassis; and
      (c) said first lift spring end is pivotally mounted about a pivot axis and wherein said central axis intersects said pivot axis;
   a first pivot stop and a second pivot stop;
   wherein said first lift spring end is adapted to abut said pivot stops upon rotation thereof about said pivot axis;
   wherein said first lift spring end is freely pivotable about said pivot axis except that, upon rotation thereof, said first lift spring end abuts said first or second pivot stop, whereby said first and second pivot stops operably limit rotation of said first lift spring end about said pivot axis to a predefined angular range between said pivot stops;
   a longitudinally extending structural member mounted on said vehicle chassis and having a bushing mounted on a distal end thereof;
   a pivot pin extending through said bushing and pivotally mounting said first lift spring end on said bushing and thereby defining said pivot axis; and
   wherein said first and second pivot stops are defined by plate members fixed to said structural member proximate said distal end thereof and lying in a plane oriented substantially perpendicular to said pivot axis.

2. The suspension system of claim 1 wherein said central axis intersects said pivot axis at an angle of approximately 90 degrees.

3. The suspension system of claim 1 wherein said pivot axis is fixed relative to said vehicle chassis.

4. The suspension system of claim 1 wherein said second lift spring end is non-pivotally fixed relative to a portion of said support arm assembly.

5. The suspension system of claim 1 wherein said vehicle chassis comprises first and second downwardly extending hangers and a cross member extending between said hangers;
   wherein said suspension system further comprises a second support arm assembly vertically coupling said axle assembly to said vehicle chassis, said support arm assembly being coupled to said first hanger and said second support arm assembly being coupled to said second hanger; and
   wherein said longitudinally extending structural member is mounted on said cross member.

6. The suspension system of claim 5 further comprising a second lift spring member, said second lift spring member being an air spring defining a second central axis, said second lift spring member having opposing third and fourth lift spring ends, each of said third and fourth lift spring ends being operably coupled to said suspension system wherein extension of said second lift spring vertically displaces said axle assembly relative to said vehicle chassis and wherein said third lift spring end is pivotally mounted to said cross member and is pivotal about a second pivot axis, said second pivot axis and said second central axis intersecting at an angle of approximately 90 degrees.

7. The suspension system of claim 1 further comprising a pivot mount secured to said first lift spring end, said pivot mount having a generally U-shaped configuration with a pair of side walls and a central web extending therebetween, said pivot axis extending between said sidewalls and intersecting said sidewalls at a substantially perpendicular axis, said first and second pivot stops being engageable with said central web on opposite sides of said pivot axis to thereby limit rotation of said first lift spring end.

8. A lift axle suspension assembly for a vehicle having a chassis, said lift axle suspension assembly comprising:
an axle assembly;
a pair of support arms operably coupling said axle assembly to the vehicle chassis wherein said axle assembly is moveable relative to the vehicle chassis between a storage position and a use position;
a support biasing member operably disposed between said axle assembly and the vehicle chassis;
a lift spring member wherein:
(a) said lift spring member is an air spring that defines a central axis and has opposing first and second ends;
(b) said lift spring member is operably disposed between said axle assembly and the vehicle chassis wherein extension of the lift spring member moves the axle assembly from the use position to the storage position; and
(c) said first lift spring end is pivotal about a pivot axis and wherein said central axis intersects said pivot axis;
a first pivot stop and a second pivot stop;
wherein said first lift spring end is adapted to abut said pivot stops upon rotation thereof about said pivot axis; and,
wherein said first lift spring end is freely pivotable about said pivot axis except that, upon rotation thereof, said first lift spring end abuts said first or second pivot stop, whereby said first and second pivot stops operably limit rotation of said first lift spring end about said pivot axis to a predefined angular range between said pivot stops;
wherein said pair of support arms includes an upper support arm having opposite ends respectively pivotally connected to said vehicle chassis and said axle assembly and a lower support arm having opposite ends respectively pivotally connected to said vehicle chassis and said axle assembly, whereby said pair of support arms defines a parallelogram linkage; and
wherein said pivot axis is fixed relative to said vehicle chassis and said second lift spring end is non-pivotally fixed to said upper support arm by a rigid member extending laterally from said upper support arm.

9. The lift axle suspension assembly of claim 8 wherein said central axis intersects said pivot axis at an angle of approximately 90 degrees.

10. The suspension system of claim 8 further comprising first and second downwardly extending hangers secured to the vehicle chassis and a cross member extending between said hangers;
wherein said suspension system further comprises a second pair of support arms operably coupling said axle assembly to the vehicle chassis, said pair of support arms being coupled to said first hanger and said second pair of support arms being coupled to the vehicle chassis through said second hanger; and
wherein said first lift spring end is pivotally mounted on said cross member.

11. A suspension system comprising:
a vehicle chassis including first and second longitudinal members, first and second hangers extending downwardly respectively from said first and second longitudinal members and a cross member extending between said first and second hangers;
an axle assembly;
a support arm assembly operably coupling said axle assembly to said vehicle chassis wherein said axle assembly is vertically moveable relative to said vehicle chassis;
a support biasing member operably disposed between said axle assembly and said vehicle chassis;
at least one lift spring member, said lift spring member being an air spring, said lift spring member having opposing first and second lift spring ends, said first lift spring end being pivotally mounted to said cross member, said second lift spring end being coupled to said support arm assembly wherein extension of said lift spring member vertically displaces said axle assembly;
a first pivot stop and a second pivot stop, said first pivot stop being fixed relative to said vehicle chassis and limiting pivotal movement of said lift spring member in a first rotational direction, said second pivot stop being fixed relative to said vehicle chassis and limiting pivotal movement of said lift spring member in an opposite second rotational direction;
a pivot mount secured to said first lift spring end, said pivot mount having a generally U-shaped configuration with a pair of side walls and a central web extending therebetween, said pivot axis extending between said sidewalls and intersecting said sidewalls at a substantially perpendicular axis, said first and second pivot stops being engageable with said central web on opposite sides of said pivot axis to thereby limit rotation of said first lift spring end:
a structural member extending longitudinally from said cross member and having a bushing mounted on a distal end thereof:
a pivot pin extending through said bushing and said side walls pivotally joining said lift spring member and said structural member and defining a pivot axis, said pivot axis intersecting a central axis defined by said lift spring member at an angle of approximately 90 degrees; and
wherein said first and second pivot stops are defined by plate members fixed to said structural member proximate said distal end thereof and lying in a plane oriented substantially perpendicular to said pivot axis.

12. The suspension system of claim 11 wherein said second lift spring end is non-pivotally fixed relative to a portion of said support arm assembly.

13. The suspension system of claim 11 wherein said support arm assembly includes an upper support arm having opposite ends respectively pivotally connected to a first one of said hangers and said axle assembly; said support arm assembly further including a lower support arm having opposite ends respectively pivotally connected to said first hanger and said axle assembly, whereby said upper and lower support arms define a parallelogram linkage; said second lift spring end being non-pivotally fixed relative to said upper support arm.

14. The suspension system of claim 13 wherein said second lift spring end is non-pivotally fixed to said upper support arm by a rigid member extending laterally from said upper support arm.

15. A lift axle suspension assembly for a vehicle having a chassis, said lift axle suspension assembly comprising:
   an axle assembly;
   a support arm assembly operably coupling said axle assembly to the vehicle chassis wherein said axle assembly is vertically moveable relative to the vehicle chassis between an uppermost position and a lowermost position, said support arm assembly including an upper support arm having opposite ends respectively pivotally connected to said vehicle chassis and said axle assembly and a lower support arm having opposite ends respectively pivotally connected to said vehicle chassis and said axle assembly, whereby said pair of support arms define a parallelogram linkage;
   a support biasing member operably disposed between said axle assembly and the vehicle chassis;
   a lift spring member wherein:
   (a) said lift spring member is an air spring having opposing first and second ends and defining a central axis;
   (b) said first end of said lift spring member is pivotally mounted about a pivot axis;
   (c) said lift spring member is operably disposed between the vehicle chassis and one of said upper or lower support arms wherein extension of said lift spring member vertically displaces said axle assembly, said central axis having a first angular position relative to said pivot axis when said axle assembly is in said lowermost position and a second angular position relative to said pivot axis when said axle assembly is in said uppermost position, said first and second angular positions defining a first predefined angular range therebetween; and
   first and second pivot stops disposed proximate said first end of said lift spring member wherein said first pivot stop limits rotation of said lift spring member in a first rotational direction about said pivot axis and said second pivot stop limits rotation of said lift spring member in a second opposite rotational direction about said pivot axis whereby rotation of said lift spring member about said pivot axis is limited to a second predefined angular range between said first and second pivot stops, said second predefined angular range being larger than said first predefined angular range.

16. The lift axle suspension of claim 15 wherein said pivot axis is fixed relative to the vehicle chassis.

17. The lift axle suspension of claim 16 wherein said second end of said lift spring member is non-pivotally fixed relative to a portion of said support arm assembly.

18. The lift axle suspension of claim 15 further comprising a pivot mount secured to said first end of said lift spring member, said pivot mount having a generally U-shaped configuration with a pair of side walls and a central web extending therebetween, said pivot axis extending between said sidewalls and intersecting said sidewalls at a substantially perpendicular axis, said first and second pivot stops being engageable with said central web on opposite sides of said pivot axis to thereby limit rotation of said first end of said lift spring member.

19. The lift axle suspension of claim 18 further comprising:
   a structural member extending in a direction substantially perpendicular to said pivot axis and having a bushing mounted on a distal end thereof, said bushing being positioned concentric with said pivot axis; and
   a pivot pin extending through said bushing and said side walls pivotally joining said lift spring member and said structural member and defining said pivot axis.

20. The suspension system of claim 19 wherein said first and second pivot stops are defined by plate members fixed to said structural member proximate said distal end thereof and lying in a plane oriented substantially perpendicular to said pivot axis.

\* \* \* \* \*